US009760573B2

(12) United States Patent
Guzik (10) Patent No.: US 9,760,573 B2
(45) Date of Patent: Sep. 12, 2017

(54) SITUATIONAL AWARENESS (71) Applicant: WHP Workflow Solutions, LLC, North Charleston, SC (US)

(72) Inventor: Thomas Guzik, Edina, MN (US)

(73) Assignee: WHP Workflow Solutions, LLC, North Charleston, SC (US)

( * ) Notice: Subject to any disclaimer, the term of this patent is extended or adjusted under 35 U.S.C. 154(b) by 171 days.

(21) Appl. No.: 13/653,372

(22) Filed: Oct. 16, 2012

(65) Prior Publication Data

US 2013/0039542 A1 Feb. 14, 2013

Related U.S. Application Data

(63) Continuation-in-part of application No. 12/637,685, filed on Dec. 14, 2009, now Pat. No. 8,311,983.

(Continued)

(51) Int. Cl.
*G06F 17/30* (2006.01)
*G11B 27/034* (2006.01)
(Continued)

(52) U.S. Cl.
CPC ...... *G06F 17/30041* (2013.01); *G11B 27/034* (2013.01); *G11B 27/322* (2013.01);
(Continued)

(58) Field of Classification Search
CPC .... G08G 1/20; H04M 11/04; H04M 1/72536; H04M 3/51; G06F 17/30; G06F 17/30817;
(Continued)

(56) References Cited

U.S. PATENT DOCUMENTS 5,877,756 A 3/1999 Um
6,975,346 B2 * 12/2005 Kumhyr ............ G06K 9/00288
348/143
(Continued)

FOREIGN PATENT DOCUMENTS

EP 1550968 A1 7/2005
KR 20110098531 9/2011
(Continued)

OTHER PUBLICATIONS

ESRI, "Public Safety and Homeland Security Situational Awareness" Feb. 2008.*
(Continued)

*Primary Examiner* — Dennis Truong
(74) *Attorney, Agent, or Firm* — Han Santos, PLLC (57) ABSTRACT

Police officers are provided with client devices capable of capturing multimedia and streaming multimedia. The client devices can upload captured multimedia to a central server or share streams in real time. A network operation center can review the multimedia in real time or afterwards. Situational awareness is the provision of multimedia to a police officer as that officer approaches the location of an incident. The multimedia may be real time streams as the officer responds to a particular location, or the multimedia may be historical files as the officer familiarizes himself with incidents as he patrols a new neighborhood. Since the client device also reports real time reporting patterns, police officers can review high resolution and fidelity patrolling and incident reports to analyze the efficacy of patrol coverage. Since the client device may run supplementary applications, example applications are disclosed.

25 Claims, 8 Drawing Sheets

Related U.S. Application Data (60) Provisional application No. 61/548,182, filed on Oct. 17, 2011, provisional application No. 61/173,459, filed on Apr. 28, 2009.

(51) Int. Cl.
   *G11B 27/32* (2006.01)
   *H04N 5/232* (2006.01)
   *H04W 4/18* (2009.01)

(52) U.S. Cl.
   CPC ........ *H04N 5/23206* (2013.01); *H04W 4/185* (2013.01); *H04N 2201/3225* (2013.01); *H04N 2201/3247* (2013.01)

(58) Field of Classification Search
   CPC ......... G06F 17/30041; G06F 17/30044; G06F 17/30867; G08B 13/19; G08B 13/19645; G08B 13/19656; G08B 13/19673; G08B 21/0476; G08B 25/009; H04N 7/181; H04N 21/2187; H04N 21/6131; H04N 21/21805; H04N 21/2743; H04W 4/22; H04W 76/007
   USPC ....... 340/539.13, 143, 539.18; 707/706, 722, 707/758, 736; 455/404.1; 348/E7.86, 348/143; 379/45, 265.02, 37, 49
   See application file for complete search history.

(56) References Cited

U.S. PATENT DOCUMENTS

| | | | |
|---|---|---|---|
| 7,046,273 B2 | 5/2006 | Suzuki | |
| 7,091,852 B2* | 8/2006 | Mason | G01C 21/206 340/539.11 |
| 7,612,680 B2 | 11/2009 | Eubank et al. | |
| 7,782,363 B2* | 8/2010 | Ortiz | 348/211.8 |
| 7,872,593 B1 | 1/2011 | Rauscher et al. | |
| 8,665,087 B2* | 3/2014 | Greene | A62B 99/00 340/539.11 |
| 8,818,829 B2* | 8/2014 | Delia | F41A 17/063 42/106 |
| 2003/0020816 A1 | 1/2003 | Hunter et al. | |
| 2003/0085989 A1 | 5/2003 | Tay | |
| 2003/0217287 A1 | 11/2003 | Kruglenko | |
| 2004/0002188 A1 | 1/2004 | Chung | |
| 2004/0024644 A1 | 2/2004 | Gui et al. | |
| 2004/0051741 A1 | 3/2004 | Venturino | |
| 2004/0101178 A1 | 5/2004 | Fedorovskaya et al. | |
| 2004/0126038 A1 | 7/2004 | Aublant et al. | |
| 2004/0146272 A1* | 7/2004 | Kessel et al. | 386/46 |
| 2004/0155960 A1 | 8/2004 | Wren et al. | |
| 2004/0217884 A1* | 11/2004 | Samadani | G01C 7/00 340/995.14 |
| 2004/0263314 A1* | 12/2004 | Dorai | G06F 21/32 340/5.2 |
| 2005/0054381 A1 | 3/2005 | Lee et al. | |
| 2005/0073575 A1 | 4/2005 | Thacher et al. | |
| 2005/0080800 A1 | 4/2005 | Parupudi et al. | |
| 2005/0101334 A1* | 5/2005 | Brown | H04L 67/22 455/456.3 |
| 2005/0118983 A1 | 6/2005 | Van Camp | |
| 2005/0132348 A1 | 6/2005 | Meulemans et al. | |
| 2005/0168574 A1 | 8/2005 | Lipton et al. | |
| 2005/0216193 A1 | 9/2005 | Dorfman et al. | |
| 2005/0258942 A1* | 11/2005 | Manasseh et al. | 340/425.5 |
| 2006/0072014 A1 | 4/2006 | Geng et al. | |
| 2006/0092043 A1* | 5/2006 | Lagassey | 340/907 |
| 2006/0182055 A1 | 8/2006 | Coffee et al. | |
| 2006/0224797 A1 | 10/2006 | Parish et al. | |
| 2006/0234758 A1 | 10/2006 | Parupudi et al. | |
| 2006/0274829 A1 | 12/2006 | Siemens et al. | |
| 2007/0033265 A1 | 2/2007 | Anderson et al. | |
| 2007/0173266 A1 | 7/2007 | Barnes | |
| 2007/0177606 A1* | 8/2007 | Jabri et al. | 370/395.5 |
| 2007/0177616 A1* | 8/2007 | Jabri et al. | 370/401 |
| 2007/0201391 A1 | 8/2007 | Belmonte et al. | |
| 2007/0208776 A1 | 9/2007 | Perry et al. | |
| 2007/0255618 A1 | 11/2007 | Meerbergen et al. | |
| 2007/0268367 A1 | 11/2007 | Agmon | |
| 2007/0268392 A1 | 11/2007 | Paalasmaa et al. | |
| 2007/0291303 A1 | 12/2007 | Tanaka et al. | |
| 2008/0005116 A1 | 1/2008 | Uno | |
| 2008/0020803 A1 | 1/2008 | Rios et al. | |
| 2008/0031426 A1* | 2/2008 | Weeks | H04M 11/04 379/45 |
| 2008/0032739 A1 | 2/2008 | Hoodbhoy et al. | |
| 2008/0052628 A1 | 2/2008 | Bugenhagen et al. | |
| 2008/0059989 A1 | 3/2008 | O'Connor et al. | |
| 2008/0182587 A1 | 7/2008 | Bennett | |
| 2008/0187181 A1 | 8/2008 | Meadow et al. | |
| 2008/0189789 A1 | 8/2008 | Lamontagne | |
| 2008/0207137 A1* | 8/2008 | Maharajh et al. | 455/74 |
| 2008/0209067 A1 | 8/2008 | John et al. | |
| 2008/0218335 A1 | 9/2008 | Attar | |
| 2008/0231460 A1 | 9/2008 | Owen et al. | |
| 2008/0250328 A1 | 10/2008 | Konttinen | |
| 2008/0252485 A1* | 10/2008 | Lagassey | 340/907 |
| 2008/0280637 A1* | 11/2008 | Shaffer et al. | 455/519 |
| 2008/0301757 A1* | 12/2008 | Demarest | G06Q 10/10 726/1 |
| 2008/0303902 A1 | 12/2008 | Romer et al. | |
| 2009/0002157 A1 | 1/2009 | Donovan et al. | |
| 2009/0006336 A1* | 1/2009 | Forstall et al. | 707/3 |
| 2009/0049004 A1 | 2/2009 | Nurminen et al. | |
| 2009/0054029 A1 | 2/2009 | Hogberg et al. | |
| 2009/0063419 A1* | 3/2009 | Nurminen et al. | 707/3 |
| 2009/0067586 A1* | 3/2009 | Fano et al. | 379/49 |
| 2009/0083121 A1 | 3/2009 | Angell et al. | |
| 2009/0087161 A1 | 4/2009 | Roberts et al. | |
| 2009/0089294 A1* | 4/2009 | Davis | H04N 7/17318 |
| 2009/0094527 A1 | 4/2009 | Parupudi et al. | |
| 2009/0204285 A1 | 8/2009 | Ellsworth et al. | |
| 2009/0207852 A1 | 8/2009 | Greene et al. | |
| 2009/0280784 A1* | 11/2009 | Mousseau et al. | 455/414.3 |
| 2009/0284348 A1 | 11/2009 | Pfeffer | |
| 2009/0322874 A1* | 12/2009 | Knutson | G08B 13/196 348/143 |
| 2010/0009700 A1 | 1/2010 | Camp, Jr. et al. | |
| 2010/0090827 A1* | 4/2010 | Gehrke et al. | 340/539.13 |
| 2010/0157061 A1* | 6/2010 | Katsman et al. | 348/149 |
| 2010/0182145 A1 | 7/2010 | Ungari | |
| 2010/0207787 A1* | 8/2010 | Catten et al. | 340/905 |
| 2010/0211575 A1* | 8/2010 | Collins et al. | 707/749 |
| 2010/0231714 A1* | 9/2010 | Flores et al. | 348/143 |
| 2010/0274816 A1 | 10/2010 | Guzik | |
| 2010/0321183 A1 | 12/2010 | Donovan et al. | |
| 2010/0332131 A1 | 12/2010 | Horvitz et al. | |
| 2011/0018998 A1 | 1/2011 | Guzik | |
| 2011/0060520 A1 | 3/2011 | Heo et al. | |
| 2011/0069172 A1* | 3/2011 | Hazzani | G08B 13/19645 348/159 |
| 2011/0227728 A1* | 9/2011 | Mathis | 340/539.29 |
| 2011/0302130 A1* | 12/2011 | Lee | G06F 17/30817 707/602 |
| 2012/0110135 A1* | 5/2012 | Sparks | 709/219 |

FOREIGN PATENT DOCUMENTS

| | | |
|---|---|---|
| WO | 2004042673 | 5/2004 |
| WO | 2007082166 A2 | 7/2007 |
| WO | 2008008448 A2 | 12/2007 |
| WO | 2008045003 A1 | 4/2008 |

OTHER PUBLICATIONS

V. Ghini et al. "Mobile E-Witness"; Jul. 19, 2007.*
Final Office Action for U.S. Appl. No. 12/637,685, mailed on Mar. 37, 2012, Thmoas Guzik , "Correlated Media for Distributed Sources", 21 pages.
U.S. Appl. No. 12/637,685—Non Final Office Action Mailed Sep. 26, 2011, 19 pages.

(56) References Cited

OTHER PUBLICATIONS

U.S. Appl. No. 12/637,685—Notice of Allowance Mailed Jul. 5, 2012, 11 pages.
EP-09844205.6—Extended EP Search Report Mailed Apr. 19, 2013, 13 pages.
EP09844205.6—Rule 70(2) Mailed May 8, 2013, 1 pages.
PCT/US12/60521—Search Report Mailed Feb. 28, 2013, 13 pages.
U.S. Appl. No. 12/894,698—Non Final Office Action Mailed May 8, 2013, 28 pages.
U.S. Appl. No. 12/894,698—Final Office Action Mailed Dec. 30, 2013, 33 pages.
U.S. Appl. No. 12/894,698—Non Final Office Action Mailed Aug. 15, 2014, 33 pages.
U.S. Appl. No. 12/894,698—Final Office Action Mailed Jan. 15, 2015, 38 pages.
U.S. Appl. No. 13/646,677—Non Final Office Action Mailed Jul. 31, 2013, 5 pages.
U.S. Appl. No. 13/646,677—Final Office Action Mailed Jul. 18, 2014, 17 pages.
U.S. Appl. No. 13/646,677—Non Final Office Action Mailed Apr. 28, 2015, 15 pages.
Non-Final Office Action dated Sep. 24, 2015, for U.S. Appl. No. 12/894,698, 45 pages.
Final Office Action dated Apr. 26, 2016, for U.S. Appl. No. 12/894,698, 54 pages.
Office Action dated Jul. 13, 2016, for U.S. Appl. No. 12/894,698, 48 pages.
Final Office Action dated Jan. 27, 2017, for U.S. Appl. No. 12/894,698, 40 pages.
Notice of Allowance dated Sep. 23, 2015, for U.S. Appl. No. 13/646,677, 15 pages.

\* cited by examiner

SITUATIONAL AWARENESS

RELATED APPLICATIONS

This patent application claims priority to U.S. patent application Ser. No. 12/637,685 "Correlated Media for Distributed Sources" filed Dec. 14, 2009, which claims priority to U.S. Provisional Patent Application Ser. No. 61/173,459, titled "Presenting Combinations of Correlated Media for Distributed Sources" filed Apr. 28, 2009, and to U.S. Provisional Patent Application Ser. No. 61/548,182, titled "Situational Awareness" filed Oct. 17, 2011 all of which are hereby incorporated in its entirety by reference.

TECHNICAL FIELD OF THE SUBJECT MATTER

The subject matter of the present application relates to aggregating and correlating distributed media.

BACKGROUND

Police officers and security personnel have access to portable video and audio devices, and have access to recordings from close circuit television ("CCTV") and other security cameras. Often video recorders are present in patrol cars to record incidents, and police officers often bring video cameras to incidents.

The present ubiquity of mobile devices with video, still, and audio capture adds to the availability of multimedia resources to officers. The public often provides multimedia to police authorities. Alternatively, the public posts multimedia to social networks or public locations on the Internet, which the police later obtain. Often the policemen themselves carry personal devices such as smart-phones, to capture yet more multimedia files.

However, the large amount of security multimedia data is often haphazardly stored, and is not necessarily accessible to officers. Files may be stored associated with a particular case identifier, but not cross-referenced or accessed in contexts other than the case. For files provided by the public, or from private sources, the files might not be indexed, and may represent a wide range of incompatible file formats. In general, multimedia files are available long after the incident, and accessed when the context is not in the officer's mind.

The result is a large amount of security multimedia data that is not optimally available to officers for analysis. Tools to assist in analysis are not available. Accordingly, there is an opportunity to optimize capture and utilization of multimedia files by providing security personnel with analysis and correlation tools for these assets.

SUMMARY

This disclosure describes situational awareness. Police officers, members of the public, or other third parties capture multimedia files, often related to incidents. These files may be shared and viewed in real-time by police officers proximate to the incident, and by police officers in a remote network operations center ("NOC"). The on-site police officers and the remote officers in the NOC coordinate to respond to the incident.

Alternatively, the files may be reviewed after the incident for analysis. Police officers touring a neighborhood may be alerted of prior incidents, and may review multimedia files of those incidents while on site. In this way, the police officers may better learn the incident history of a particular geolocation. Alternatively, particular incidents may be analyzed at the NOC in an effort to detect patterns to help break unsolved cases.

The NOC may also review aggregate reports of incidents to determine incident patterns, and to determine the efficacy of responses, police officer allocation, and other practices.

Accordingly, to support situational awareness, this disclosure describes the capture of geolocation specific multimedia files, and reviewing the files. The captured files may be reviewed in real-time, or afterwards, either on or near the location of capture or remotely on a client device, or remotely at a NOC. When reviewing the captured multimedia files, the multimedia files may be filtered, or commented on. Information on the multimedia files may be aggregated into reports and with report specific user interface controls.

This disclosure further describes the use of security cameras not directly controlled by a police officer. Supported scenarios include automated license plate recognition ("ALPR").

This Summary is provided to introduce simplified concepts for improving discoverability using behavioral data, which are further described below in the Detailed Description. This Summary is not intended to identify essential features of the claimed subject matter, nor is it intended for use in determining the scope of the claimed subject matter.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Situational Awareness

Situational awareness is the general term for receiving supplemental information to aid response to a given situation. In this application, the supplemental information may include video, still image, and audio support. By effectively sharing this information, in a timely manner, in the context of an incident in the field, the officer can be notified of threats and be provided other relevant information that he cannot see for himself. Accordingly, situational awareness gives officers a competitive advantage in responding and analyzing incidents, especially in real time. Thus, situational awareness is said to be a "force-multiplier" for officers in the field. Furthermore, by giving early notice of threats and increasing the window of time to respond, the risk to police officers can be materially reduced.

Figure 1:
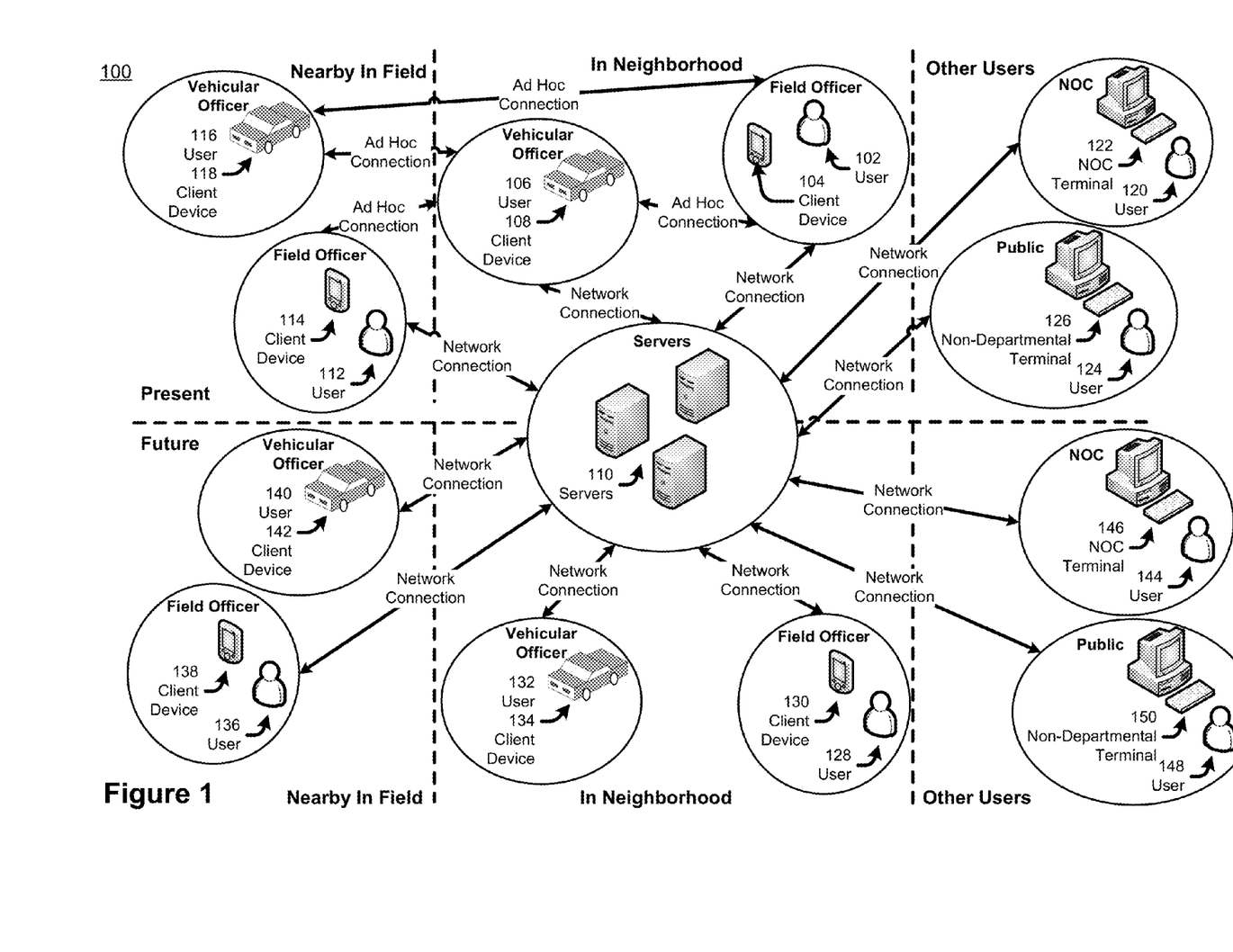
FIG. 1 is a context diagram illustrating an example situational awareness platform embodiment.

FIG. 1 illustrates several potential contexts for situational awareness 100 across various locations and across time. Specifically, FIG. 1 illustrates scenarios covering police officers at the site of an incident a particular neighborhood, or nearby police officers who are not in the neighborhood of an incident, and remote users who are not on-site and will either monitor or aid the police officers responding to the incident on-site. These scenarios generally cover as real-time responses to present incidents, such as incidents in progress, or recent incidents. During these scenarios, video, still images, audio and multimedia files in general are captured by officers in the field and uploaded to servers.

FIG. 1 also shows reviewing captured multimedia files after the incidents, in order to analyze the particular incident, or to obtain aggregate data on incidents. Captured multimedia files are available to officers who are proximate to a location where an incident occurred. Alternatively, captured multimedia files are available to officers not necessarily near the location where the incident occurred, but might otherwise be of interest to the officers. The multimedia files and their respective data may be available to remotes users such as a NOC or by the public in order to assess crime or incident patterns and to determine the efficacy of police practices.

Situational awareness starts with the capture of data relating to an incident, criminal or otherwise, and relating to the officer in the field. The officer in the field may be a field officer on-foot, 102, with a client device 104, or a vehicular officer 106 with a mounted client 108. In the present discussion, a vehicle includes anything to aid the officer's mobility, which may include patrol cars, motorcycles and horses. The field officer's client device 104 and the vehicular office's client device 108 both have multimedia capture capability and cellular communications capability. Both devices 104, 108 may be able to establish a network connection to one or more central servers 110. The central servers 110 store captured multimedia files and their associated metadata, for correlating the captured multimedia files to aid search and retrieval. In this way, client devices 104, 108 may upload captured multimedia files and associated metadata to the central servers 110 for future retrieval. Client devices 104, 108 also have the ability to establish a network connection, through an ad hoc network or otherwise, with each other. The client devices 104 and 108 and their capabilities are described in further detail with respect to FIG. 2.

While police officers 102 and 106 are patrolling a neighborhood, nearby there may be another field officer 112 on foot with a client device 114 and another vehicular officer 116 with a client device 118. As with the neighborhood patrolling police officers 102, 106, the client devices 114, 118 of the nearby police officers 112, 116 have the ability to establish a network connection with the central servers 110 and with each other. Accordingly, the client devices 114, 118 of the nearby police officers 112, 116 may also establish network communications, adhoc or otherwise, to the client devices 104, 108 of the neighborhood patrolling police officers 102, 106. In sum, neighborhood police officers, 102, 106 and nearby police officers 112, 116 have connectivity to the central servers 110 and with each other.

While patrolling, the officers 102, 106, 112, 116 are capturing multimedia files and are broadcasting their status to the central servers 110 with their respective client devices 104, 108, 114, 118. For example, the police officers 102, 106, 112, 116 may broadcast their personal status which may include location, whether they are afoot or in vehicle, whether they are engaged, or in an emergency, or otherwise broadcast device status such as communications problems, or device faults. Thus, metadata and status data may be uploaded to the central servers 110, in addition to multimedia files. Further note that uploaded multimedia files need not be related to a crime or emergency incident, but may also include observations of any interest to the police officers in the field 102, 106, 112, 116. Example observations may be the establishment of a new store or feature in the neighborhood for further reference, unusual traffic patterns, or general surveillance.

The metadata, status data, and multimedia files in central servers 110 are also accessible to remote police officer 120 in a network operations center ("NOC") 122. A NOC is a central location where the police respond to incidents in progress, dispatch police accordingly, and after the incident where the police and other incident investigators review data of individual incidents and in the aggregate to detect patterns. For incidents in progress, a NOC police officer 120 is to monitor the progress and status of the police officers in the field 102, 106, 112, 116, provide informational support as needed and to coordinate the officers. The monitoring may be done via a secure terminal in the NOC 122 which provides data feeds of uploaded metadata, status data and multimedia files.

A public user 124 may access at least some of the metadata, status data, and multimedia files in central servers 110 from a non-departmental terminal 126 such as a personal computer. For example, a public user 124 may be interested in reviewing police incidents in their neighborhood. Furthermore, they may supplement the metadata, status data, and multimedia files in central servers 110 by uploading still images and videos related to data corresponding to incidents in the central servers 110. This provides the police and incident investigators in general may have access to data from the interested public, and are not limited to data collected by police officers 102, 106, 112, 116. For example, the public user 124 might report an incident, for example to a 911 service, via the non-departmental terminal 126, and upload related still images and videos to central servers 110. By way of example, the public may respond to an "Amber Alert" where the police notify the public of a missing child, and the public send in reports, comments, still images and videos in response. In this way, the police and incident investigators have the benefit of the reach of a "social network" and/or "wiki" comprising the community.

An advantage of having access to centralized servers 110 and the files stored therein is that a police officer may retrieve not only files they have uploaded, but any file that any police officer has uploaded in the past. In one scenario, a field officer 128 may have client device 130, or a vehicular officer 132 may have client device 134 while patrolling a neighborhood that police officers 102, 106 have previously uploaded data. As polices officers 128, 132 approach a location where a crime incident occurred, their respective client devices 130, 132 will display videos, still images, or audio recordings of incidents that occurred at that location. The multimedia files might play immediately, or be selectable from a user interface on the respective client device 130, 132. The police officers 128, 132 might be interested in only a particular type of incident, for example violent crime, or thefts. Accordingly, the police officer 128, 132 might filter multimedia files arriving from the central server 110 via settings on a user interface on the client device 130, 132. Furthermore, if the police officer 128, 130 has a comment or observation related to the multimedia file, the police officer 128, 130 may enter that comment via the user interface on the client device 130, 132.

Police officers need not be proximate to the location of an incident to be interested in data relating to that incident. Field officer 136 with client device 138 and vehicular officer 140 with client device 142 may be en route to a neighborhood, and may query central servers 110 for multimedia files relating to incidents in that neighborhood. Alternative, police officers 136, 140 may be investigating an incident similar to a prior incident in a different neighborhood, and may query central servers 110 and filter for similar incidents in other neighborhoods, using client devices 138, 142. In this way, police officers 136, 140 may report connections or observations linking incidents which may assist resolving incidents faster than otherwise.

As previously stated, a network operations center ("NOC") is not only used by police officers to respond to incidents in progress, it may also be used to analyze data of past incidents. Specifically, a NOC police officer 144 may use terminal 146 to access files in the central server 110 to analyze data relating to specific incidents, or to review data aggregated across several incidents. The NOC police officer 144 may use terminal 146 to also review statistical reports. Statistical and other reports are described with respect to FIG. 5 and FIG. 6 below.

In sum, a situational awareness system, such as shown in 100, allows police officers to store multimedia data relating to incidents, make the data centrally available in real-time or near real-time, allowing other police officers in the field, or in the NOC, or the public to supplement the data as an incident is in progress, and to make the data of individual incidents or in aggregate available for review and analysis afterwards by officers in the field, or in the NOC, or by the public.

Exemplary Client Device

In FIG. 1, terminals 122, 126, 146, 150 typically include any device that may network to central servers 110. Exemplary terminals include personal computers, laptops, and tablet devices. Connectivity may be via Ethernet, Wi-Fi, or other connection protocols wired or wireless.

Figure 2:
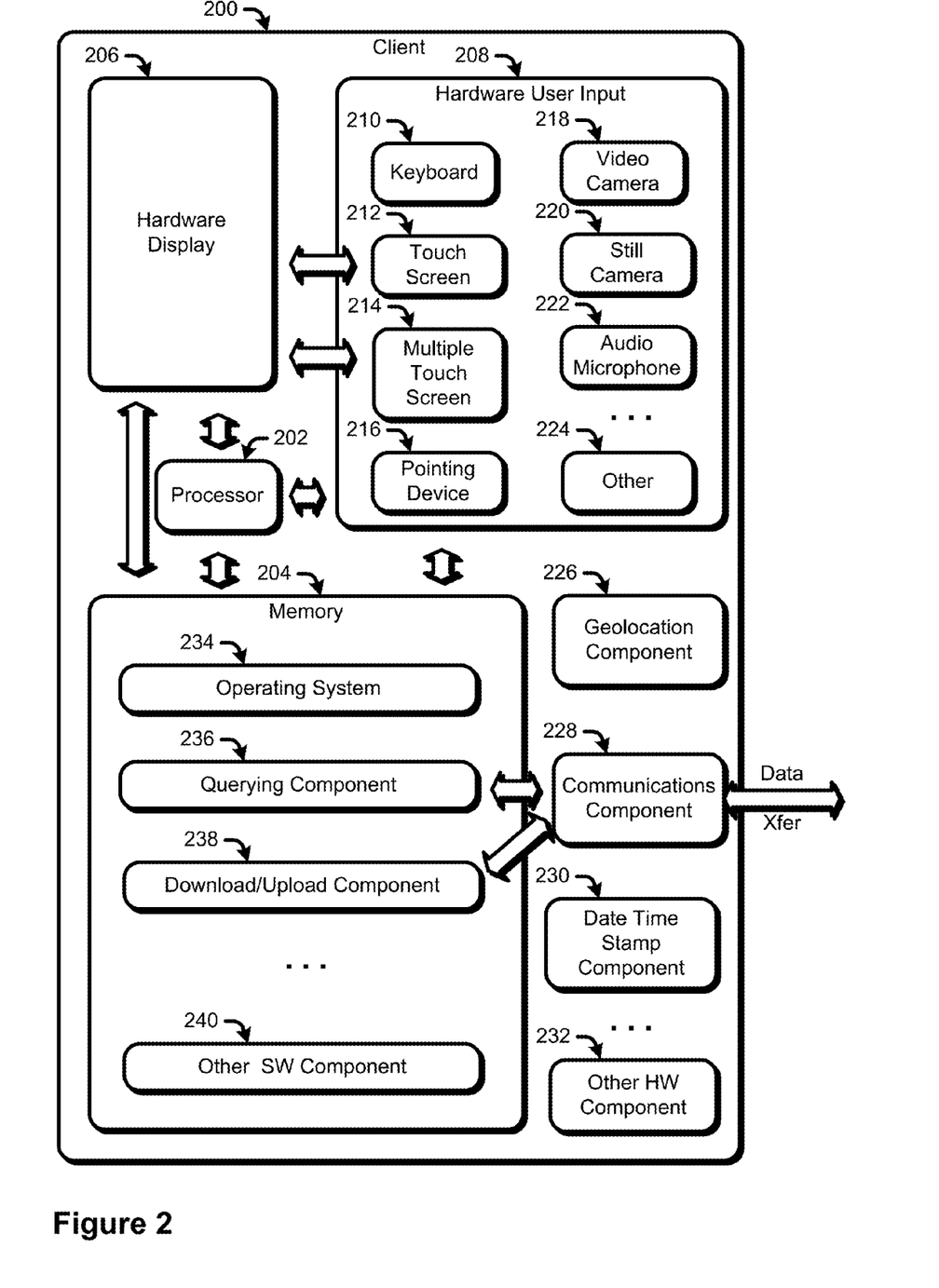
FIG. 2 is a block diagram illustrating an example embodiment of a client device for situational awareness.

Officer client devices 104, 108, 114, 118, 130, 132, 138, 140 may be a portable computing device capable of wireless network connectivity such as a mobile cellular phone or mobile laptop with wireless communications, geolocation, and multimedia capture capabilities. FIG. 2 illustrates an exemplary officer client device 200.

Client device 200 has a processor 202 communicatively coupled to a computer readable memory 204. A computer readable memory may include read only memory ("ROM") such as a ROM chip or EEPROM chip or may include volatile memory such as a mini-hard drive, flash memory or read only memory ("RAM") chips.

The processor 202 may also be communicatively coupled to a hardware display 206 to provide visual output of the client device and to at least one hardware user input 208 to receive user input. The hardware display 206 and the hardware user input 208 may be either integrated or separate. For example, the hardware user input 208 may be a separate keyboard 210 such as a thumb keyboard or button array. Alternatively, the hardware user input 208 may be integrated with the hardware display 206 as a touch screen 212 or a multiple touch screen 214 where touch screen 212 responds to a single contact per input gesture, and where a multiple touch screen 214 responds to one or more simultaneous contacts per input gesture. Input gestures are user input patterns interpreted by a hardware user input 208 to select and manipulate items displayed on the hardware display 206. In lieu of, or alternatively in order to supplement a touch screen 212 or a multiple touch screen 214, client device may receive input gestures from an arbitrary pointing device 216 such as a keyboard J-stick, joystick, touchpad, or mouse.

Client device 200 may capture multimedia in different species. It may capture video via video camera 218, still images via digital still camera 220, audio via audio microphone 222. Audio microphone 222 and video camera 218 may act in concert as to capture audio integrated with video.

Client device 200 may have other hardware input 224 which may include sensors, or other input devices. For example, client device 200 may have a motion detection sensor which triggers an event to activate a sleeping client device 200. Alternatively, client device 200 may have a second camera for example a rearward facing camera to supplement a forward facing camera.

Client device 200 may also have a geolocation component 226 to programmatically determine the geolocation of the client device 200. Geolocation may be performed by a global positioning system ("GPS") receiver, or if using cellular communications via cell tower triangulation. Regardless of the how geolocation component 226 operates, it generates a geolocation identifier, or coordinates that can be associated with a multimedia file as to determine whether the multimedia file was captured in a location proximate to the location of the client device 200, or was captured within a predetermined distance from the client device 200.

As client device 200 is capable of communicating with central servers 110, client device 200 may have a communications component 228 to perform data transfer with the central servers 110 or with other client devices. The communications component 228 may be a cellular radio capable supporting some 3G or 4G cellular protocol. Alternatively, the communication component 228 may be a Wi-Fi wireless radio. In some cases, client device 200 may utilize wired communications such as Ethernet. In general, the client device 200 may support communications on a dedicated network such as a police department network where the central server 110 resides. Alternatively, the client device 200 may participate in an ad hoc network, in order to communicate and transfer files with other client devices 200 in a peer to peer fashion.

Client device 200 also may capture metadata along with multimedia files such as a date/time stamp via a date/time stamp component 230. Date/time stamp component 230 may be a system clock, or a hardware device communicative with the system clock. For example as a video file is captured with video camera 218, the client device 200 will associate a date/time stamp with the video file as captured with date/time stamp component 230.

Client device 200 may support other hardware components. In general, client device 200 may support an interface such as Bluetooth™ or infrared ("IRDA") to communicate with other external input devices.

Client device 200 has a number of software components within memory 204. A software component is a set of computer readable instructions capable of being executed by the processor 206 to perform a specified method. Software components in memory 204 may include an operating system 234. Example operating systems 234 include Android from Google™ or iOS from Apple Computer™. Alternatively, operating system 234 may be a custom embedded operating system.

Client device 200 is operable to enable a user to query and manipulate local files on the client device 200 and/or files on central server 110. Accordingly, the software components in memory 204 may include a querying component 236 to receive user inputted queries and filters to specify files and other desired data. If querying local data, the querying component 236 will perform a search for files on the client device as stored in memory 204. Alternatively, the querying component 236 will send user inputted queries and filters to central server 110 which in turn performs the search for files and other desired data.

For remote data, such as files and other data on central server 110, client device 200 utilizes a download/upload component 238 in concert with communications component 228 to perform the actual transfer of files. Download/upload component 238 may be bidirectional in communications. Specifically, download/upload component 238 may be used to upload local files such as video files captured by video camera 218. Alternatively, download/upload component 238 may be used to download files retrieved upon execution of queries on central server 110. In this way, client device 200 supports situational awareness, by enabling a user to receive audio or video, either real time or historical. The audio or video may be received from other officers, or from the central server 110 as queried, or alternatively may be affirmatively pushed to the client device 200 by other officers in a NOC.

Client device 200 may also store other software component 240. For example, client device 200 may have installed various applications to enable the browsing of content either locally or on central server 110. Those applications may enable a user to add commentary or notes to existing incidents, or to annotate multimedia files. Alternatively, the applications may support editing, rendering, or other manipulation of multimedia files.

Client device 200 may be remotely controlled. Accordingly, software components in memory 204 may include an application to support the remote starting and stopping of media capture, and the remote control of client device 200 to upload or stream captured media. For example, a police officer in a NOC may view data in real time as captured by a client device 200 of an officer in the field 102, 106, and may control the recording remotely. Since the NOC supports receiving multimedia from the client devices of different officers, the NOC may be able to switch viewing between each of the received multimedia streams.

Client device 200 is a mobile device to be wearable by a police officer or mounted in a police vehicle. Accordingly, client device 200 includes a chassis that support clips and straps and other mounting hardware to support wearable or vehicle mounted scenarios.

Situational Awareness File Filtering

Figure 3:
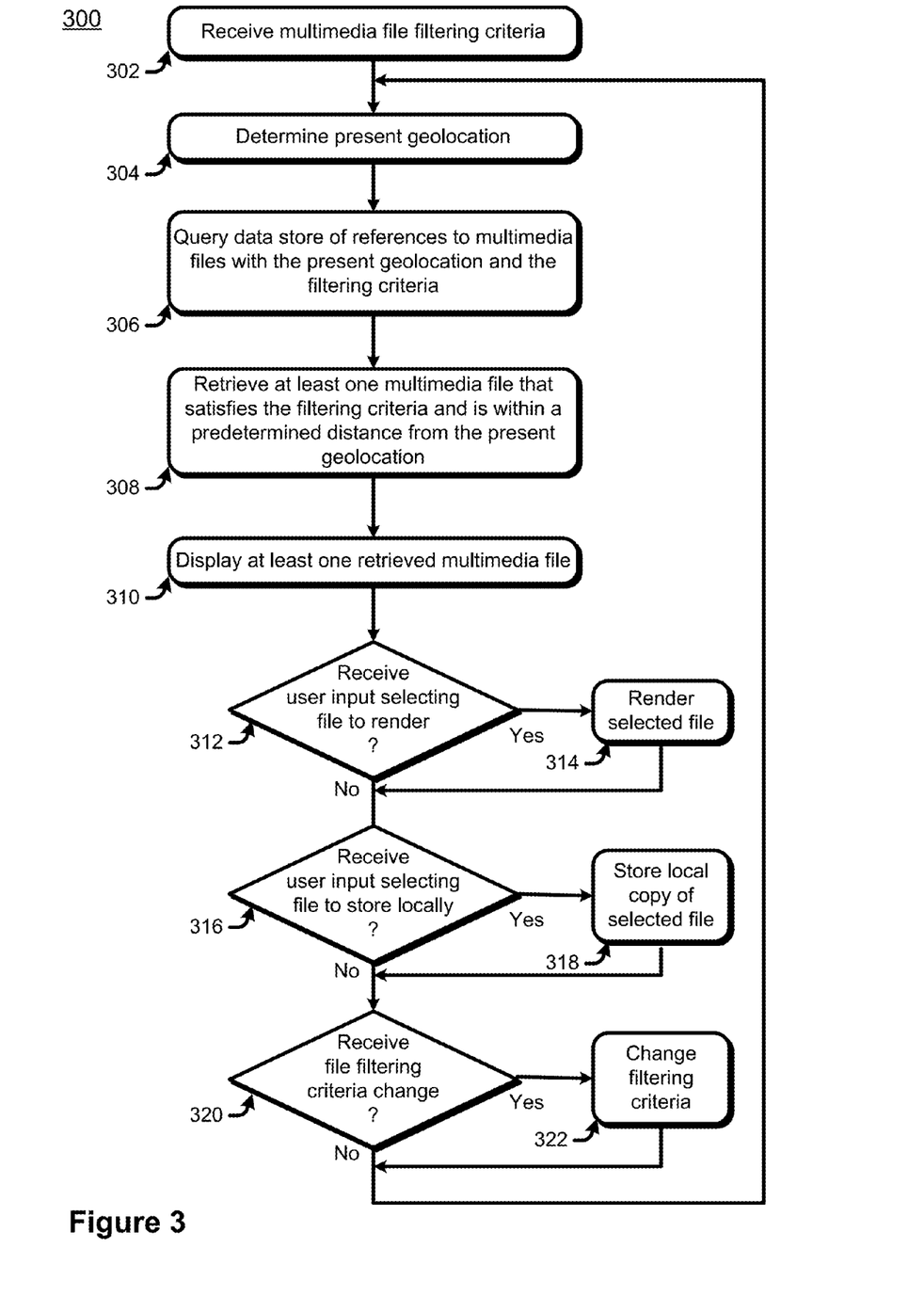
FIG. 3 is a flow chart illustrating an example embodiment of situational awareness file filtering.

Situational awareness supports not only the capture of video in real-time, but also the provision of historical incident files to an officer in the field filtered by geolocation, incident, or other criteria. This provision of files according to these criteria while an officer is in the context of a location is situational awareness file filtering. Consider a police officer in the field patrolling a neighborhood. As the police officer approaches the location where one or more incidents occurred, the police officer's client device automatically queries the central servers for files relating to those incidents. The police officer may then select and render those files on the client device. In this way, the police officer may more rapidly learn about the incident history of a neighborhood while actually being situated in that neighborhood. Thus the police officer can associate incidents with that police officer's own observations while in the actual location of the incident. FIG. 3 is a flow chart 300 of situational awareness file filtering.

In block 302, the client device receives criteria by which to filter on. The criteria may be preprogrammed by the officer, or may be received in the field. Alternatively, the criteria may be provided remoted by a police officer in a NOC. The criteria may be triggered by geolocation. However, since a neighborhood may be a high incident area, the criteria may include other criteria. For example, the filtering criteria may be limited to violent crimes, performed within a particular time period. By way of another example, the police officer may be investigating crimes performed by a particular individual, and accordingly may filter to receive only information related to that individual. Alternatively, the police officer may be on the way to assist another officer in the field during an incident in progress, and may filter to receive only files related to that particular incident.

The filtering criteria in block 302 may also specify what type of data to receive. For example, the retrieved files may be solely the multimedia files in the central server 110. Alternatively, it may include the associated commentary and annotations provided by other officers, by using a police officer identifier or identifier of a person who captured the multimedia file or annotated the multimedia file. The identity of the person who captured a file and the date/time stamp are examples of multimedia file metadata tag values that are associated with a multimedia file, but other metadata tag values such as geolocation and file type may be used as filtering criteria. Furthermore, since the multimedia files may be integrated with a police department's case database, the files served may include case data files such as the set of all incident reports related to the case. Specifically, filtering criteria may use a case number used as an index for cases in a case database or event type such as whether an incident was a violent crime or a non-violent crime. Thus served files include not only the multimedia files but any desired data related to the respective multimedia file or to an incident in common. Thus the filtering criteria in block 302 may also serve to define desired data associated with multimedia files or to an incident to retrieve.

Block 304 starts a loop to receive files. Specifically, in block 304, the client device determines the present geolocation. In block 306, the client device then queries the central server 110 and/or local storage on the client device itself for any corresponding files, based on the geolocation received in block 304 and any other filtering criteria received in block 302.

When the query in block 306 is complete, the central server 110 will return the queried data. In block 308, the client device will retrieve the data provided by the central server and integrate with any local data satisfying the filter criteria.

In block 310, the client device will display at least one of the retrieved data files. The client device could display a single file best matching the criteria. Alternatively, the client device could display thumbnail summaries of the data retrieved in block 308. A thumbnail summary of a video file is a selected image frame of the video that helps a user identify the video. Since the number of files retrieved could be larger than could be displayed on the client device's hardware display, the client display could provide a user interface for the user to scroll through and browse the retrieved data.

As the user browses the retrieved data, in block 312 the user may select a retrieved file for rendering. Upon selection, for example selection of a video, in block 314 the file may be played on the client device. The client device may also provide a user interface to show associated commentary and annotations or related case data. One advantage of situational awareness is that it enables the capture of police officer observations while in the field, and at the same time associates those observations with multimedia files. Thus historical files are constantly being reviewed in context, and being supplemented with commentary and/or annotations. In block 314, in addition to rendering a retrieved file, a user may provide their own commentary and/or annotations and associate with the file. The commentary and/or annotations may be uploaded to the central server 110. Alternatively, the commentary and/or annotations may be stored locally, for the user to further refine prior to upload.

Alternatively, in block 316, the user may select a retrieved file for storage in block 318. In this way, the user may return to the file and play later at a time of the user's choosing.

Upon receiving the retrieved files, the user may decide that the filter criteria does not match what the user is looking for. Accordingly, in block 320, the user may opt to change the filtering criteria in block 322. Any of the filtering criteria specified in block 302 may be edited. Operation then returns to block 304.

In this way, the client device provides a constant feed of historical incident data relating to a police officer's geolocation and other specified filtering criteria, as a police officer patrols a neighborhood.

Situational Awareness in Real-Time

Figure 4:
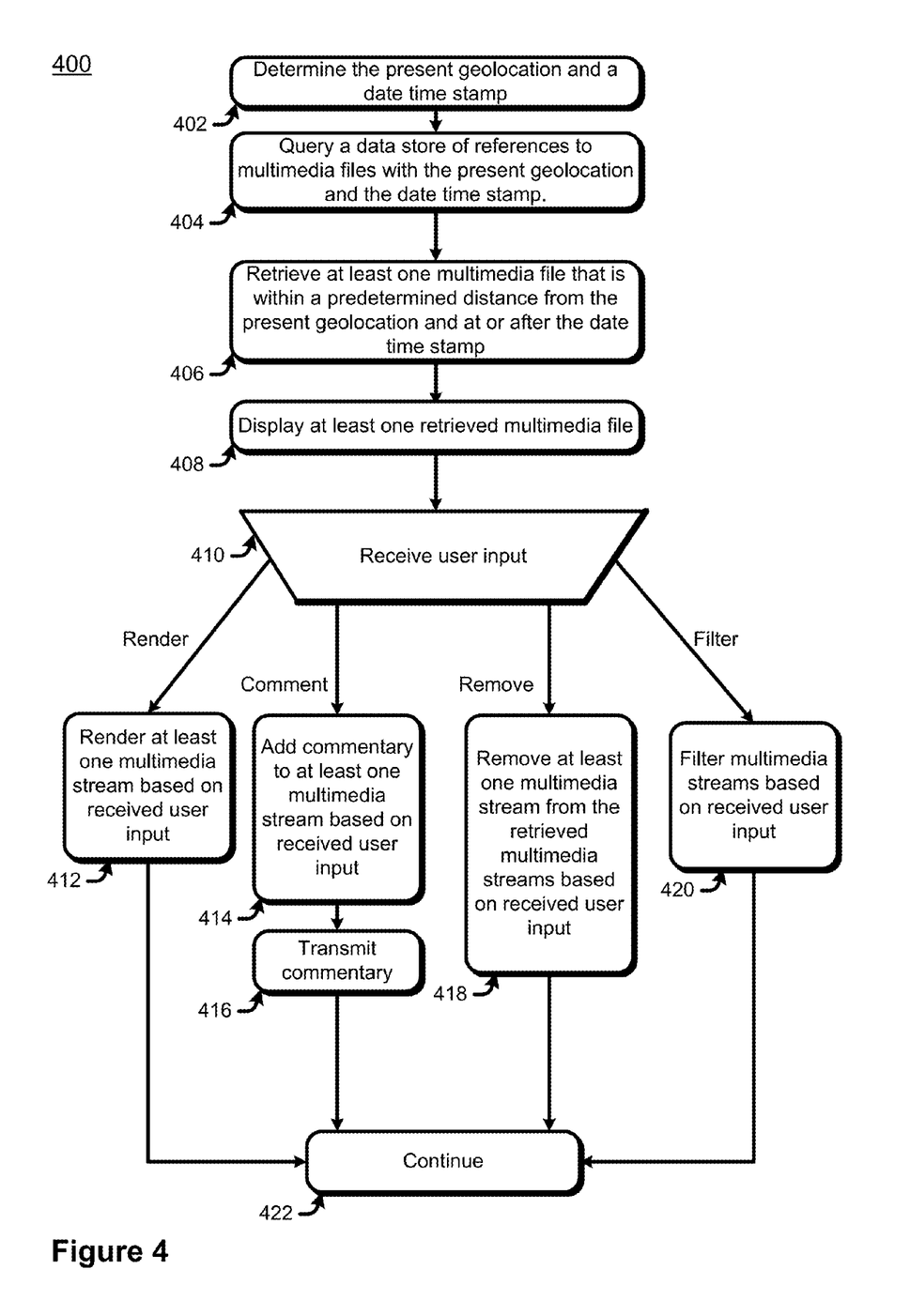
FIG. 4 is a flow chart illustrating user interactions with an example situational awareness embodiment.

Another advantage of situational awareness is that it automates the provision of multimedia streams relating to an incident in progress in substantively real-time. This aids the coordination of units responding to the incident via sharing information. FIG. 4 is a flow chart 400 of an exemplary embodiment of this process.

In block 402, the client device determines its geolocation and its present date/time stamp. In block 404, the client device uses the geolocation and the date/time stamp from block 402 to query a data store. The data store may be a central server 110. Alternatively, the data store may be proximate client devices participating on a peer to peer or ad hoc network. Note that block 402 starts a loop in which the data store in block 404 is periodically polled. Specifically, for each loop, the data store in block 404 is queried at least once, in order to ensure substantively real time update of geolocation and substantively real time update of multimedia received by the client device.

In block 406, the query retrieves at least one multimedia file within a predetermined distance from the present geolocation, at or after the date/time stamp. The retrieved multimedia files may be in the form of actual persisted files on a storage. Alternatively, to speed response, the multimedia files may be the live multimedia streams served from a client device of another police officer. Specifically, the query is retrieving multimedia streams presently being captured by nearby client devices. In this way, the client device is receiving nearby multimedia devices substantively in real time.

In block 408, the client device displays at least one retrieved multimedia stream. The client device may display one retrieved stream best matching some selection criteria. Alternatively, the client device may provide a user interface to allow the user to browse the retrieved streams.

In block 410, the client device receives user input. The user may select one of the retrieved streams and may opt to render the stream, add commentary, remove the stream, or add/edit filtering criteria.

If the user opts to render the stream, then in block 412, the client device plays the selected stream. The user may specify options on how to render the stream. For example, the user may display the stream in full screen mode. Alternatively, the user may display the stream along with other data.

If the user opts to comment on the stream, then in block 414 the user can provide input via text. Alternatively, since the officer is busy responding to the incident, the officer may not be able to text and may simply provide commentary via audio. If the client device is configured to transmit commentary, then in block 416, the commentary is shared with other client devices and/or the NOC. Since the NOC officer is not in the field, the NOC officer is able to take the commentary, and supplement/edit the commentary. For example, the police officer may provide audio commentary that the perpetrators of an incident are the "Jones Gang." The NOC officer may then retrieve data about the Jones Gang and their identities, and serve it not only to the officer providing the commentary, but also to the client devices of all other responding officers.

In some cases, a stream from a client device may be proximate, but not desirable. For example, if a responding officer's device becomes inoperable or obstructed, in block 418, the user may opt to filter out streams from that officer's device. In particular, a streams that a user opts out of are added to a "do not display list" and are blocked from display subsequently. In that way, a user need not reblock streams that have already be reblocked. Rather, retrieved streams for a query are added to a list of candidate multimedia streams, and the streams in the "do not display list" are removed from the list of candidate multimedia streams. The remaining multimedia streams are then displayed on the client device.

In general, as an officer responds to an incident, there is the risk of information overload. The officer may configure the client device to filter out streams such that in block 420 only streams matching the filtering criteria are displayed. For example and officer may opt only for streams from particular officers. Alternatively, the officer may opt only for streams as selected by the NOC, or for streams matching specified video quality criteria. In the latter case, an officer could display only videos where the contrast is at a predetermined level. In this way, only clear video might be shown.

Figure 5:
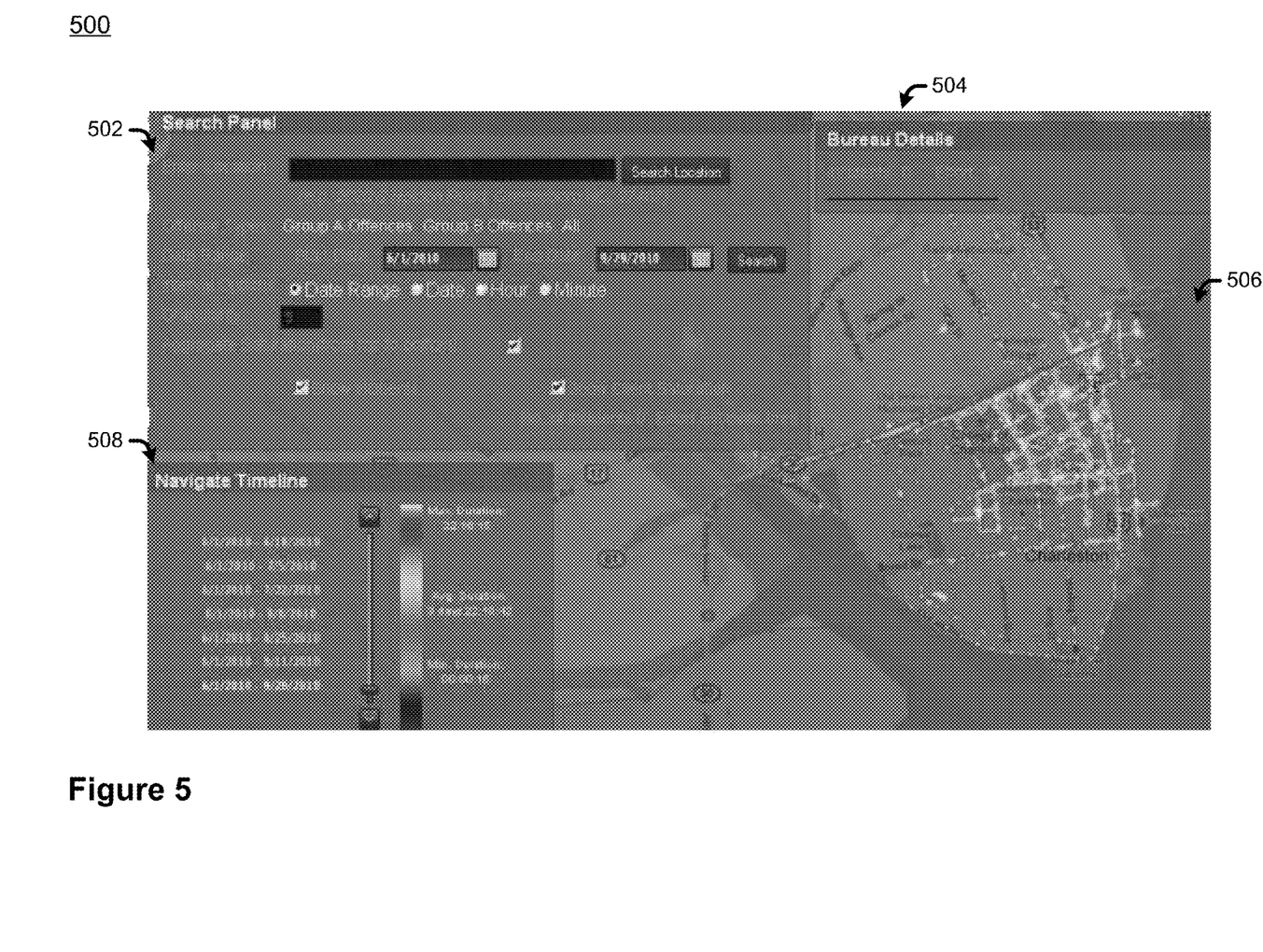
FIG. 5 illustrates filtering in an example user interface for situational awareness.
Figure 6:
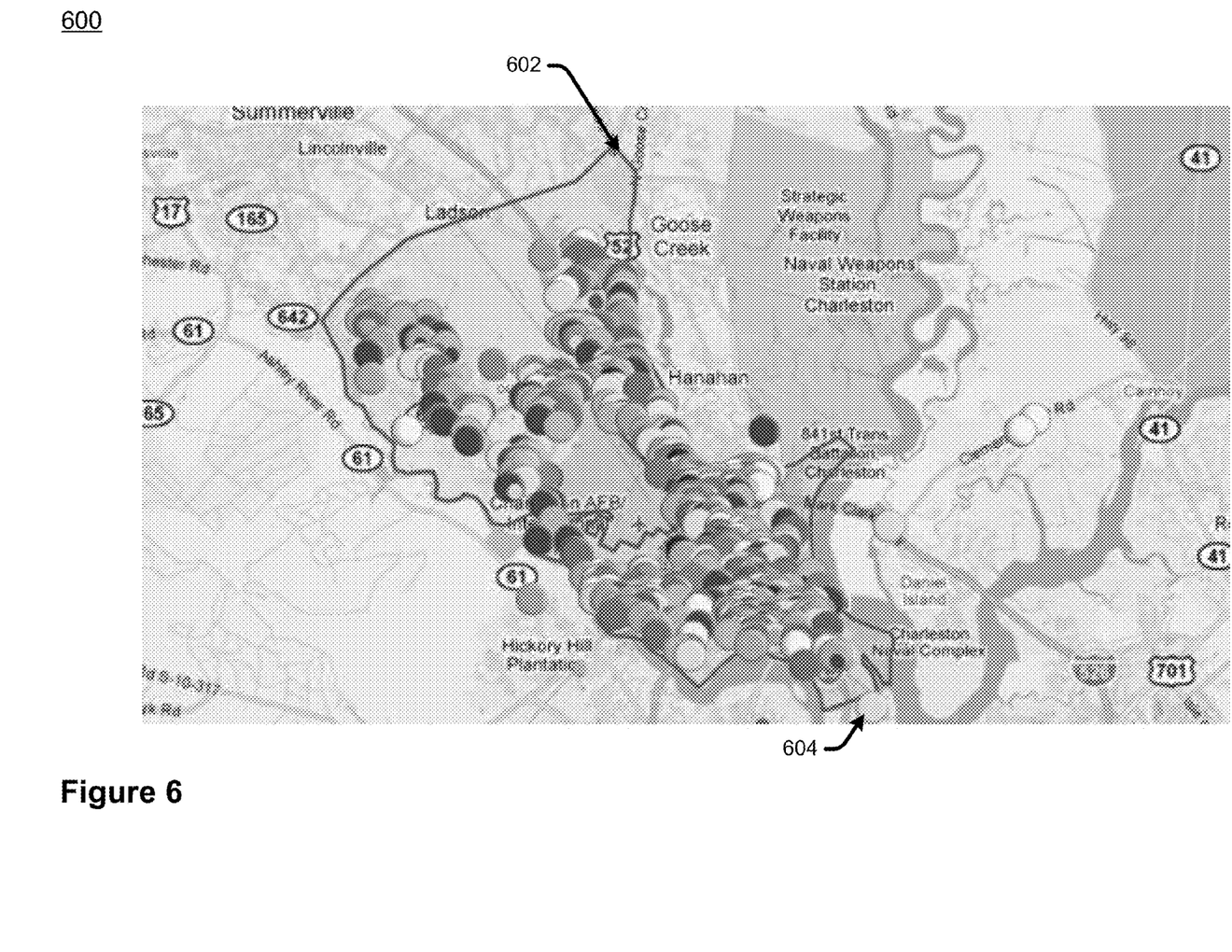
FIG. 6 illustrates an example coverage user interface for situational awareness.

In block 422, operation loops back to block 402, and the process continues until the officer shuts the loop off User Interface and Statistical Reports Another advantage of situational awareness is that the fidelity and resolution of incident reporting is greatly increased. At the NOC, a police officer may analyze data relating to a single incident or may analyze aggregated data across multiple incidents. FIGS. 5 and 6 illustrate some exemplary user interfaces and statistical reporting enabled by situational awareness.

FIG. 5 illustrates a saturation map 500 of police coverage around a location. Since client devices may report their location to the NOC, the NOC can aggregate patrol information and show how much coverage different neighborhoods receive. Based on this information, an analyzing police officer at the NOC can correlate incident rates with coverage.

In search panel 502, the user may specify search and filter criteria. Criteria may include location, offense types (e.g. violent versus non-violent crime), a date range, time intervals to set the degree of resolution on the saturation map, and viewing options. Viewing options include whether to overlay police coverage over incidents.

In aggregation details panel 504, the user may view a summary of aggregate statistics based on the search panel. The user may select a metric or statistic to calculate on the data such that the user may measure whether police operations are improving or not. Example calculated metrics may include the absolute number of incidents by a police department and a percentage measure of coverage. Other example metrics may include ratio of population density to number incidents; and ratio of law enforcement coverage to number of incidents.

In map panel 506, the user may view a color coded are patterned map showing which neighborhoods have received more police patrols. The map may also overlay dots indicating incidents. In this way, the user may correlate patrol coverage with increasing or decreasing incident rates. The incident overlay is described in more detail with respect to FIG. 6.

In timeline panel 508, the user may scroll through different time slices as specified by the time interval resolution set in search panel 502. As the user scrolls, the user may view the change in coverage and the change in incidents in map panel 506.

Saturation map 500 provides many advantages to a police department as it provides a way to assess whether their patrolling strategy is effective or not. With present technology, police departments can only estimate when an area is patrolled. For example, a police department may send a patrol car every night at 1:00 AM to a high crime location, but if the crimes are all occurring at 4:00 AM, the police department cannot pinpoint why the patrolling is not effective. With the saturation map, the police department has the benefit of near real time data, and is more likely to be able to determine the relationship between patrolling and incidents.

FIG. 6 shows an incident map 600. A user may select a particular neighborhood 602 as delineated by a border. All the incidents occurring within the area may be shown on the map 600, where the incidents are indicated by a icon 604 in this case a dot.

The icons 604 may be selected or may be color coded based on incident type. This would allow an analyzing police officer to differentiate between for example violent and non-violent crimes. The incidents may also be filtered by incident type, time range, as well as other criteria. For example, a incidents may be filtered by a particular perpetrator, victim profile, or responding officer.

In some embodiments, the icon 604 may be selected to show incident data. The incident data may include the multimedia files and related data to allow the analyzing officer to drill down onto the particular incident. In particular, if integrated with a case database, selecting the icon 604 may retrieve all incident reports associated with the case.

In other embodiments, the analysis on the incident map may be stored and shared with other officers. For example, the selected location and filters could be persisted in a file and then stored on a common share for others to retrieve.

The incident map is but only one example of the reports possible with the higher fidelity and resolution of data made possible via situational awareness.

Exemplary Application—License Plate Recognition

Figure 7:
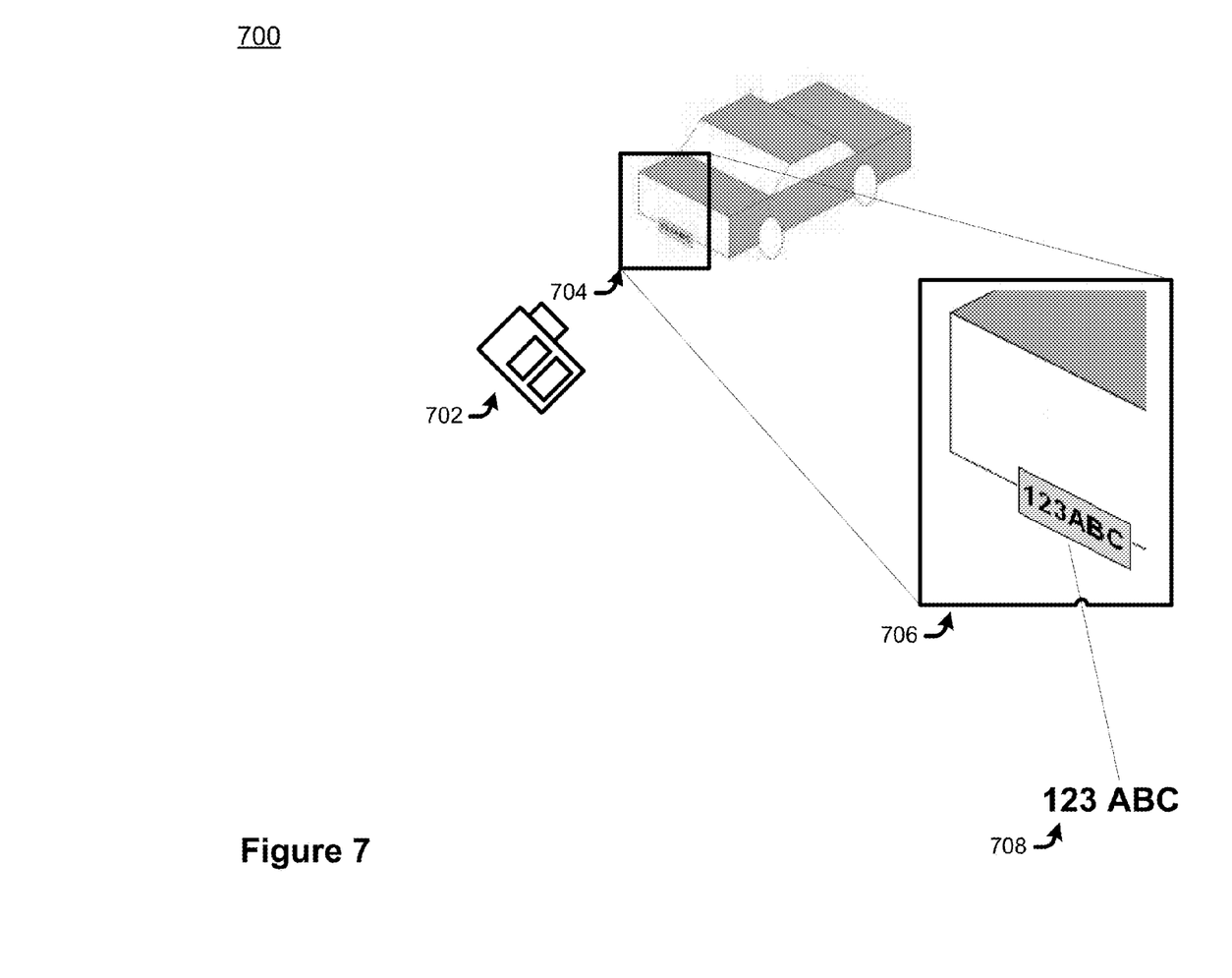
FIG. 7 illustrates an example of automatic license plate recognition in situational awareness.

The client device 200 may be operated remotely. In this way, the client device 200 may operate as an ad hoc surveillance camera. The client device 200 may store custom applications. One example is that of license plate recognition. FIG. 7 illustrates a particular application 700 of the client device 702 as used for license plate recognition.

Specifically, client device 702 is positioned in a stationary position. Client device 702 may be configured to sense for moving cars. Alternatively, the client device 702 may be operated remotely and the operator may point the client device 702 as to track a particular car.

Figure 8:
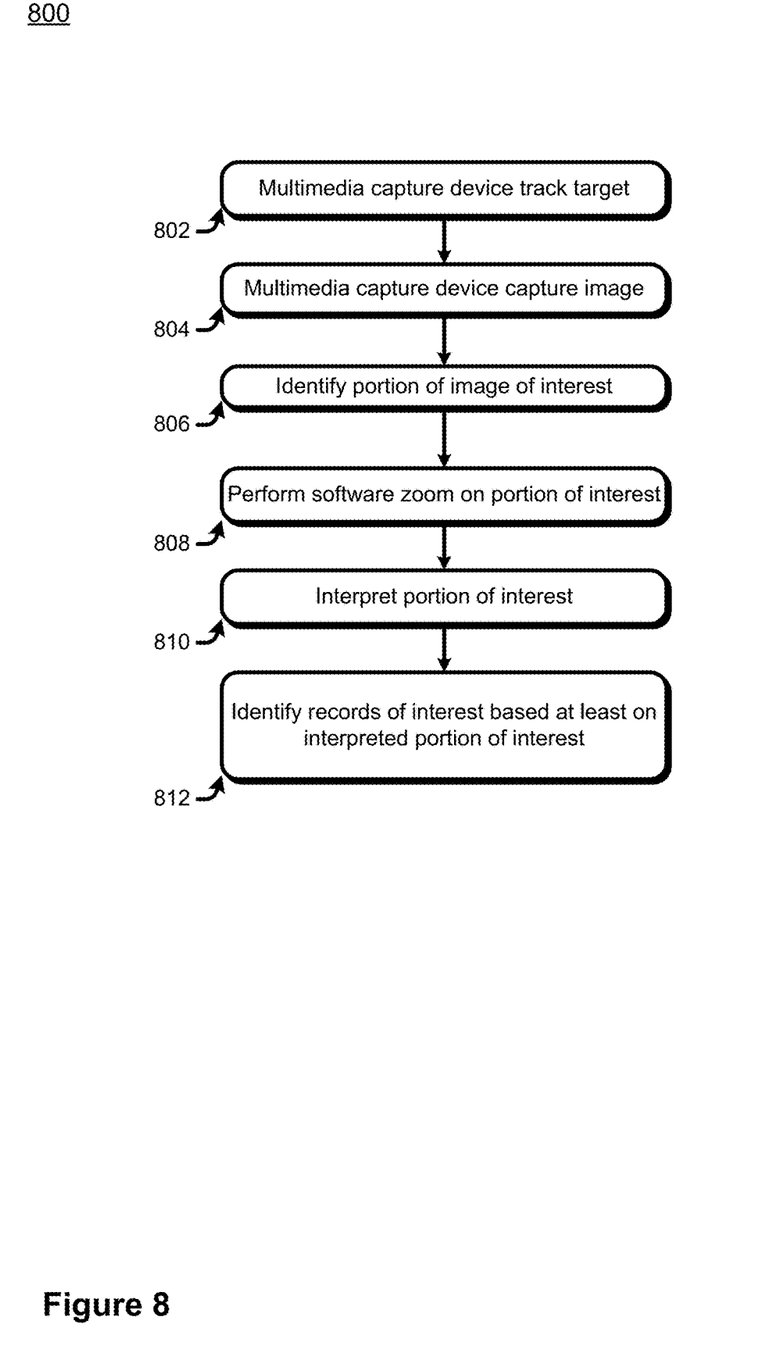
FIG. 8 is a flow chart of an example embodiment of automatic license plate recognition in situational awareness.

Client device 702 may capture a digital image of the car's license plate 704. The client device 702 may then analyze the captured digital image 706 and then extract out the license plate number 708 for further analysis and search. FIG. 8 provides a flow chart 800 of one embodiment of the license plate recognition and data analysis and search functionality.

In block 802, the multimedia capture device 702 tracks a target vehicle, either by sensor or by remote operation. In block 804, the sensor or a remote operator may trigger the capture of a digital image of the target vehicle.

Since the captured image is digital, it lends itself to digital analysis techniques. The multimedia capture device 702 may use object recognition techniques in block 806 to identify a portion of the digital image corresponding to the license plate. Once the license plate portion is identified, in block 808 may perform a software zoom on the license plate. Specifically, the multimedia capture device 702 will eliminate all pixels except of the license plate and expand the picture. This is achieved by applying pixel dithering algorithms to interpolate the likely pixel values in expanding the picture.

Once the license plate is zoomed upon in block 808, the resolution of the digital image should be sufficient to interpret the portion of interest in block 810, for example to extract the license plate number.

Once the license plate number is extracted in block 810, the multimedia capture device 702 may initiate a search on a case database or other database for all records related to the license plate. As mentioned above, extraction is not limited to license plates, but may apply to any portion of interest. Other examples include facial recognition and object recognition. By way of another example, during an "Amber" alert, police may be looking for a beige 1999 Model Y made by car manufacturer X with license plate AAA111. While resolution may not be sufficient to interpret the license plate, the multimedia capture device could determine that an image was of a beige 1999 Model Y made by X.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of reviewing geolocation specific multimedia files, the method comprising:
   storing one or more multimedia files related to a current crime incident that are uploaded by a public user at a data store of multimedia files of a law enforcement network operations center, the one or more multimedia files being sent to the law enforcement network operations center by the public user in response to a public release of at least one multimedia file capturing the current crime incident by the law enforcement network operations center;
   determining for a mobile client on a law enforcement officer, a present geolocation of the mobile client as the law enforcement office is en route to the current crime incident;
   obtaining a current date time stamp from a date time stamp device of the mobile client;
   automatically querying the data store of multimedia files at the law enforcement network operations center with multimedia file filtering criteria and the current date time stamp as the present geolocation of the mobile client on the law enforcement officer shows that the mobile client is approaching a location of the current crime incident, the multimedia file filtering criteria and the current date time stamp being used to select for specific multimedia files of the current crime incident that are captured after the current date time stamp and captured within a predetermined distance from the present geolocation;

retrieving at least one multimedia file of the specific multimedia files from the data store of the law enforcement network operations center; and providing the at least one multimedia file to the mobile client of the law enforcement officer for display by the mobile client.

2. The method of claim 1, wherein the multimedia file filtering criteria further includes at least one of a time range, an event type, a case number, an identity of a person who captured a multimedia file, and a multimedia file metadata tag value.

3. The method of claim 1, wherein a multimedia file that is retrieved via the multimedia file filtering criteria is associated with at least one case, further comprises:

along with the multimedia file that is retrieved, retrieving case data associated with the multimedia file; and along with displaying the multimedia file that is retrieved, displaying at least a portion of the case data associated with the multimedia file.

4. The method of claim 1, further comprising:

receiving user commentary via the mobile client, the user commentary related to a multimedia file that is displayed; and transmitting the user commentary and a reference of the multimedia file that is displayed for associating the user commentary and the multimedia file that is displayed in the data store.

5. The method of claim 1, further comprising:

receiving user input to change the multimedia file filtering criteria;

changing the multimedia file filtering criteria according to the user input into changed filter criteria; and querying the data store of multimedia files with the present geolocation and the changed filtering criteria.

6. The method of claim 1, where displaying the at least one multimedia file comprises:

displaying a thumbnail summary of a multimedia file to be displayed;

receiving user input to render the multimedia file to be displayed; and rendering the multimedia file for display on the mobile client in response to the user input.

7. The method of claim 1, further comprising:

receiving user input to store a local copy of the multimedia file as displayed on the mobile client; and responsive to receiving user input to store the local copy of the multimedia file currently being displayed;

downloading the local copy of the multimedia file currently being displayed to the mobile client; and storing the local copy of the multimedia file on the mobile client.

8. A method of reviewing geolocation specific multimedia files, the method comprising:

storing one or more multimedia files related to a current incident that are uploaded by a public user at a data store of multimedia files at a law enforcement network operations center, the one or more multimedia files being sent to the law enforcement network operations center by the public user in response to a public alert of the current incident by the law enforcement network operations center, the public alert providing least one multimedia file related to the current incident for review by the public user via a computing device;

determining from a mobile client on a law enforcement officer, a present geolocation of the mobile client;

obtaining a current date time stamp from a date time stamp device of the mobile client on the law enforcement officer;

automatically querying a data store of multimedia files for one or more multimedia files as the present geolocation of the mobile client on the law enforcement officer shows that the mobile client is approaching a location of the current incident, the one or more multimedia files including a multimedia file of the current incident that is captured after the current date time stamp and captured within a predetermined distance from the present geolocation of the mobile client;

retrieving the multimedia file of the current incident from the data store of the law enforcement network operations center; and providing the multimedia file of the current incident to the mobile client of the law enforcement officer for display by the mobile client.

9. The method of claim 8, further comprising periodically repeating the querying of the data store of multimedia files to retrieving at least one other multimedia file that has not already been retrieved and which is captured within a predetermined distance from the present geolocation; and displaying the at least one other multimedia file at the mobile client.

10. The method of claim 8, wherein the displaying the multimedia file of the current incident comprises:

displaying a thumbnail summary of the multimedia file of the current incident to be displayed;

receiving user input to render the multimedia file of the current incident to be displayed; and rendering the multimedia file of the current incident for display on the mobile client in response to the user input.

11. The method of claim 8, further comprising:

receiving user commentary via the mobile client, the user commentary related to a multimedia file that is displayed; and transmitting the user commentary and a reference of the multimedia file that is displayed for associating the user commentary and the multimedia file that is displayed in the data store.

12. The method of claim 8, further comprising:

receiving a user input indicating that a particular multimedia file as displayed is not relevant;

storing a reference of the particular multimedia file in an display exclusion list in response to the user input;

retrieving a list of candidate multimedia files from the data store of multimedia files via one or more multimedia file filtering criteria;

removing from the list of candidate multimedia files the particular multimedia file in the display exclusion list to generate a list of remaining candidate multimedia files; and displaying at least one remaining candidate multimedia file in the list of remaining candidate multimedia files on the mobile client.

13. The method of claim 8, further comprising receiving a plurality of multimedia file filtering criteria, and further querying the data store of multimedia files based at least on the plurality of multimedia file filtering criteria.

14. The method of claim 13, further comprising:

receiving a user input that changes the plurality of multimedia file filtering criteria has been received;
changing the multimedia file filtering criteria according to the user input into changed filtering criteria; and
querying the data store of multimedia files based at least on the changed filtering criteria to retrieve one or more additional multimedia files.

15. A mobile client apparatus to review geolocation specific multimedia files comprising:
a user input device operative to receive user inputs to the mobile client apparatus;
a geolocation device operative to determine a present geolocation of the mobile client apparatus;
a wireless communications device operative to provide data communication between the mobile client apparatus and a central server;
a display component operative to present data; and
a software querying component operative to receive multimedia file filtering criteria via the user input device, to obtain the present geolocation of the mobile client apparatus from the geolocation device, and to automatically send a query comprising the multimedia file filtering criteria over the wireless communications device to the central server as the present geolocation of the mobile client apparatus shows that the mobile client apparatus is approaching a location of current crime incident, the multimedia file filtering criteria selecting for multimedia files that include one or more multimedia files of the current crime incident that are sent to a law enforcement network operations center by a public user in response to a public release of a multimedia file capturing the current crime incident by the law enforcement network operations center for review by the public user via a computing device, the multimedia file being captured by an additional mobile device of another law enforcement officer, the software querying component further operative to receive at least one multimedia file from the central server in response to the query, wherein the display component is operative to display the at least one multimedia file;
a date time stamp device that provides date time stamps, wherein the software querying component is to obtain a current date time stamp from the date time stamp device along with the present geolocation of the mobile client apparatus, and to send an additional query comprising the date time stamp in addition to the multimedia file filtering criteria over the wireless communications device to the central server to select for multimedia files of the current crime incident that are captured after the current date time stamp.

16. The mobile client apparatus of claim 15, further comprising:
a multimedia capture device that records multimedia files; and
a software multimedia capture component to capture the multimedia files, and to upload the multimedia files over the wireless communications device to the central server.

17. The mobile client apparatus of claim 16, wherein the multimedia capture device is a video camera, a still image digital camera, or an audio recorder.

18. The mobile client apparatus of claim 15, further comprising a software multimedia download component to download the at least one multimedia file from a central server over a wireless connection provided by the wireless communications device.

19. The mobile client apparatus of claim 15, wherein the user input device includes a touch screen, a multiple touch screen, a keyboard, or a mouse.

20. A method of reviewing geolocation specific multimedia files, the method comprising:
storing one or more multimedia files related to a current crime incident that are uploaded by a public user at a data store of multimedia files at a law enforcement network operations center, the one or more multimedia files being sent to the law enforcement network operations center by the public user in response to a public release of at least one multimedia file capturing the current crime incident by the law enforcement network operations center for review by the public user via a computing device;
determining for a mobile client of a law enforcement officer, a present geolocation of the mobile client;
obtaining a current date time stamp from a date time stamp device of the mobile client;
automatically querying the data store of multimedia files with multimedia file filtering criteria and the current date time stamp as the present geolocation of the mobile client shows that the mobile client is approaching a location of a current crime incident, the multimedia file filtering criteria and the current date time stamp being used to select for specific multimedia files of the current crime incident that are captured after the current date time stamp and captured within a predetermined distance from the present geolocation, in which the specific multimedia files include one or more multimedia files of the current crime incident that are sent to the law enforcement network operations center by the public user in response to the public release;
retrieving at least one multimedia file of the specific multimedia files from the data store of the law enforcement network operations center, the at least one multimedia being associated with a case number of a crime incident report; and
providing the at least one multimedia file and a crime incident report related to the case number to the mobile client of the law enforcement officer for display by the mobile client.

21. The method of claim 20, wherein the multimedia file filtering criteria further include at least one of a time range, an event type, a case number, an identity of a person who captured a multimedia file, and a multimedia file metadata tag value.

22. The method of claim 20, further comprising:
receiving user commentary via the mobile client, the user commentary related to a multimedia file that is displayed at the mobile client; and
transmitting the user commentary and a reference of the multimedia file for associating the user commentary and the multimedia file that is displayed in the data store.

23. The method of claim 20, further comprising:
receiving user input to change the multimedia filtering criteria;
changing the multimedia file filtering criteria according to the user input into changed filter criteria; and
querying the data store of multimedia files with the present geolocation and the changed filtering criteria.

24. The method of claim 20, where displaying the at least one multimedia file comprises:
displaying a thumbnail summary of a multimedia file to be displayed;

receiving user input to render the multimedia file to be displayed; and rendering the multimedia file for display on the mobile client in response to the user input.

25. The method of claim 20, further comprising:

receiving user input to store a local copy of the multimedia file as displayed on the mobile client; and responsive to receiving user input to store the local copy of the multimedia file currently being displayed;

downloading the local copy of the multimedia file currently being displayed to the mobile client; and storing the local copy of the multimedia file on the mobile client.

\* \* \* \* \*